(12) United States Patent
Hoff et al.

(10) Patent No.: US 10,105,797 B1
(45) Date of Patent: Oct. 23, 2018

(54) WELDING TABLE (71) Applicant: BTD Manufacturing, Inc., Detroit Lakes, MN (US)

(72) Inventors: Nathan Hoff, Callaway, MN (US); Chad Mayfield, Detroit Lakes, MN (US)

(73) Assignee: BTD MANUFACTURING, INC., Detroit Lakes, MN (US)

( * ) Notice: Subject to any disclaimer, the term of this patent is extended or adjusted under 35 U.S.C. 154(b) by 0 days.

(21) Appl. No.: 15/630,468

(22) Filed: Jun. 22, 2017

(51) Int. Cl.
*B23K 37/04* (2006.01)
*B25H 1/16* (2006.01)
*B25H 1/02* (2006.01)

(52) U.S. Cl.
CPC ........... *B23K 37/0461* (2013.01); *B25H 1/02* (2013.01); *B25H 1/16* (2013.01)

(58) Field of Classification Search
CPC ......... B23K 37/0461; B25H 1/02; B25H 1/16
See application file for complete search history.

(56) References Cited

U.S. PATENT DOCUMENTS

| | | | | |
|---|---|---|---|---|
| 4,073,484 A * | 2/1978 | Beekenkamp | ........... | B25H 1/04 108/118 |
| 6,986,310 B2 * | 1/2006 | Calfas | ................. | A61G 5/1059 108/147 |
| 7,862,409 B1 * | 1/2011 | Sheppard | ........... | A22C 17/0033 452/198 |
| 8,065,967 B2 * | 11/2011 | Wong | ................. | B23K 37/0461 108/155 |
| 9,188,278 B1 * | 11/2015 | Li | ............................ | A47B 9/10 |
| 9,862,088 B2 * | 1/2018 | Luis y Prado | ........... | B25H 1/14 |
| 2003/0024446 A1 * | 2/2003 | Lanphear | ................. | A47B 9/10 108/147 |
| 2008/0308611 A1 * | 12/2008 | Alessi | ................ | B23K 20/1205 228/112.1 |
| 2011/0240612 A1 * | 10/2011 | Maeno | ............... | B23K 26/0884 219/121.63 |

(Continued)

FOREIGN PATENT DOCUMENTS

JP 06195936 A * 7/1994 ............. B29C 65/08

OTHER PUBLICATIONS

Dan's Custom Welding Tables LLC, Welding Table Deluxe, accessed Oct. 3, 2017 from website, http://www.danscustomweldingtables.com/products-services/welding-table-deluxe-tig/.

(Continued)

*Primary Examiner* — Hanh V Tran
(74) *Attorney, Agent, or Firm* — Dorsey & Whitney LLP (57) ABSTRACT

A welding table may include a table top and one or more legs coupled with the table top. The table top and the one or more legs may be electrically conductive. To inhibit an electric charge from being transmitted from the table top to the one or more legs, the one or more legs may be electrically isolated from the table top. By electrically isolating the one or more legs from the table top, electrical equipment associated with the welding table may be protected from damage, such as electrical burnout. In certain implementations, the one or more legs may be height adjustable, and electrical equipment for adjusting the height of the one or more legs may be protected from damage by electrically isolating the one or more legs from the table top.

20 Claims, 9 Drawing Sheets (56) References Cited

U.S. PATENT DOCUMENTS

| | | | | |
|---|---|---|---|---|
| 2014/0015186 A1* | 1/2014 | Wessel | ............... | B23Q 1/037 |
| | | | | 269/97 |
| 2015/0075410 A1* | 3/2015 | Wong | ............... | B23K 26/38 |
| | | | | 108/28 |
| 2015/0103856 A1* | 4/2015 | Hagino | ............... | H01S 5/02212 |
| | | | | 372/44.01 |
| 2015/0166090 A1* | 6/2015 | Hardy | ............... | B62B 3/02 |
| | | | | 280/47.35 |
| 2015/0272318 A1* | 10/2015 | Isgr | ............... | F16B 1/00 |
| | | | | 108/90 |
| 2017/0087673 A1* | 3/2017 | Tsui | ............... | B23K 37/0461 |

OTHER PUBLICATIONS

Global Industrial.com, Work Bench Systems, accessed Oct. 3, 2017 from website, http://www.globalindustrial.com/p/work-benches/systems/adjustable-height/47w-x-46d-welding-table-3500lb-capacity-black?infoParam.campaignId=T9F&gclid=Clq26KvDuNICFYi2wAodUvQJGw.

Grainger, Welding Table, 78W, 38D, Cap 4400, accessed Oct. 3, 2017 from website, https://www.grainger.com/product/BUILDPRO-Welding-Table-30D321.

* cited by examiner

WELDING TABLE

TECHNICAL FIELD

The present disclosure relates to welding. More particularly, the present disclosure relates to a welding table.

BACKGROUND

Welding tables commonly are used in the fabrication industry. Typically, welding tables include a tabletop for supporting one or more work pieces undergoing fabrication. The tabletop is coupled to one or more legs for supporting the tabletop above a support surface, such as a floor in a fabrication facility. An example welding table is described in U.S. Pat. No. 8,065,967.

SUMMARY

In embodiments, a welding table is provided. In certain implementations, the welding table may include a table top and one or more legs coupled with the table top to support the table top above a support surface, such as a floor in a building. The table top and the one or more legs may be electrically conductive. To inhibit an electric charge from being transmitted from the table top to the one or more legs, the one or more legs may be electrically isolated from the table top. By electrically isolating the one or more legs from the table top, electrical equipment associated with the welding table may be protected from damage, such as electrical burnout. In certain implementations, the one or more legs may be height adjustable, and electrical equipment configured to adjust the height of the one or more legs may be protected from damage by electrically isolating the one or more legs from the table top.

In embodiments, a method of assembling a welding table is provided. In certain implementations, the method includes coupling a leg to an isolator and coupling a table top to the isolator such that the isolator electrically isolates the leg from the table top to inhibit an electric charge from being transmitted from the table top to the leg. By electrically isolating the leg from the table top, electrical equipment associated with the welding table may be protected from damage, such as electrical burnout. In certain implementations, the method further includes coupling a divider to the table top such that the divider is electrically isolated from the table top. The divider may protect a welder's eyes from flash from an adjacent welder's arc.

DETAILED DESCRIPTION

Described herein is a welding table. The welding table may include a table top coupled with one or more legs that support the table top above a support surface, such as a floor in a building. The table top may support one or more work pieces for welding purposes, and the table top may be formed from an electrically conductive material, such as a metal. In certain implementations, the table top is formed from steel, such as one inch thick steel sheet. The table top may be grounded via connection to a welding ground of a welding machine, thereby enabling a welder to weld one or more work pieces supported on the table top. The one or more legs of the welding table may be formed from a material with sufficient strength to sturdily support the table top while a welder is welding on one or more work pieces disposed on the table top. In certain implementations, the one or more legs are formed from an electrically conductive material, such as a metal. In certain implementations, the one or more legs are formed from aluminum, such as one inch thick aluminum tubes. In certain implementations, the one or more legs are formed from steel, such as steel tubes. The one or more legs may have various cross-sectional profiles, including circular or rectangular.

The one or more legs of the welding table may be electrically isolated from the table top to prevent an electric charge from being transmitted from the table top to the one or more legs. In some implementations, electrical equipment (such as a controller, a power inverter, and/or a linear actuator) is coupled with the one or more legs. The electrical equipment may be configured to adjust the height of the welding table by, for example, raising and lowering the table top relative to the ground surface. The electric isolation of the one or more legs from the table top may prevent damage to the electrical equipment. For example, the electric isolation of the one or more legs from the table top inhibits an electric charge from a welding procedure from damaging the electrical equipment.

Figure 1:
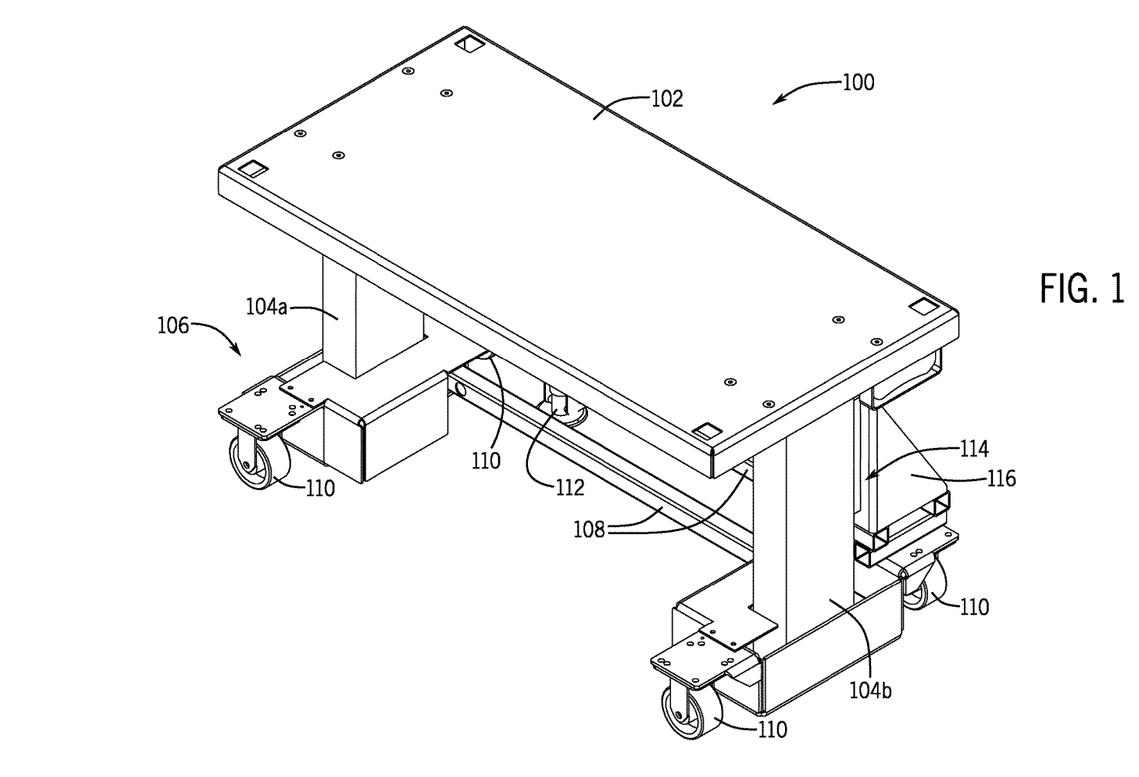
FIG. 1 is a front isometric view of a welding table, according to certain implementations.
Figure 2:
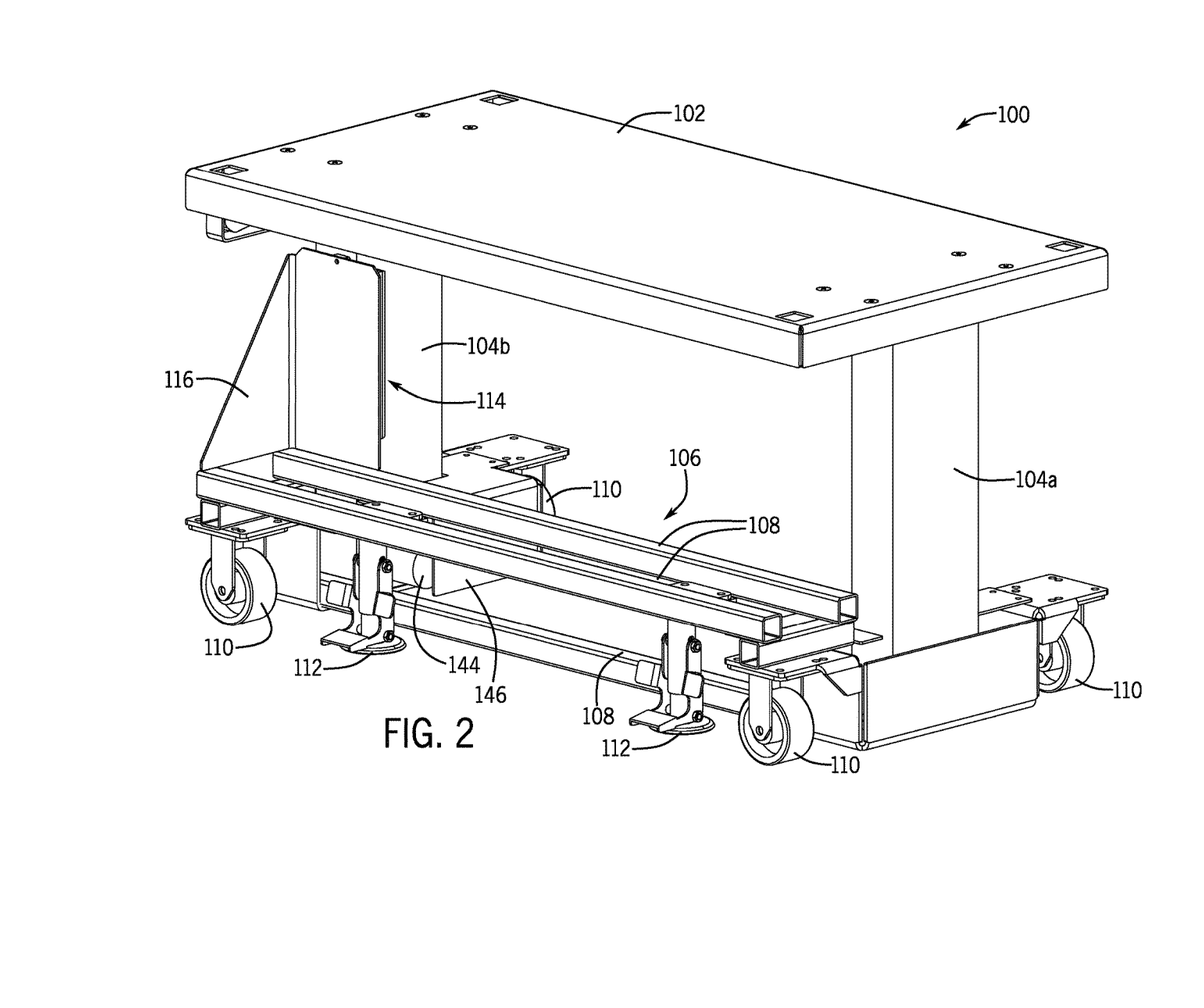
FIG. 2 is a rear isometric view of the welding table of FIG. 1, according to certain implementations.

FIG. 1 is a front isometric view of a welding table, and FIG. 2 is a rear isometric view of a welding table, according to certain implementations. The welding table 100 illustrated in FIGS. 1 and 2 includes a table top 102 and legs 104a, 104b. The legs 104a, 104b may be coupled with the table top 102 to support the table top 102 above a support surface, such as floor in a building. As illustrated in FIGS. 1 and 2, the table top 102 may be oriented substantially horizontal, and the legs 104a, 104b may be oriented substantially vertical. The table top 102 may be positioned on top of the legs 104a, 104b and may define a substantially flat work surface for supporting one or more work pieces. The table top 102 may be formed from a sheet of material, and peripheral edge portions of the table top 102 may be bent, folded, or otherwise extended downwardly to form side surfaces 105 (see FIG. 6) of the table top 102. Upper ends of the legs 104a, 104b may be coupled with the table top 102, and lower ends of the legs 104a, 104b may be positioned proximate a support surface, such as a floor in a building. As illustrated in FIGS. 1 and 2, the legs 104*a*, 104*b* may be positioned at opposite ends of the welding table 100 beneath a middle portion of the table top 102 in a depth direction. Although the welding table 100 is illustrated with two legs 104*a*, 104*b* in FIGS. 1 and 2, the welding table 100 may include more or less than two legs.

As illustrated in FIGS. 1 and 2, the welding table 100 may include a base 106 coupled with the legs 104*a*, 104*b*. The base 106 may provide structural integrity to the welding table 100. For example, the base 106 may provide lateral stiffness to the legs 104*a*, 104*b* to inhibit lateral movement of the lower ends of the legs 104*a*, 104*b*. To provide lateral stiffness, the base 106 may include one or more cross bars 108 extending laterally between the legs 104*a*, 104*b*. The one or more cross bars 108 may be offset rearward of the legs 104*a*, 104*b* to provide space between the legs 104*a*, 104*b* to accommodate a welder's legs, such as while a welder is sitting in a chair and welding on a work piece positioned on the table top 102. In some implementations, the one or more cross bars 108 may support a welding machine above a support surface, such as a floor in a building.

Referring still to FIGS. 1 and 2, the welding table 100 may be mobile. For example, as illustrated in FIGS. 1 and 2, the base 106 may include one or more wheels 110 for moving the welding table 100 as desired. The one or more wheels 100 may be fixed, swivelable, or a combination thereof. In certain implementations, the wheels 100 may be configured as casters. As illustrated in FIGS. 1 and 2, the welding table 100 may include four wheels 110 positioned at corners of the welding table 100. Two of the wheels 100 may flank one leg 104*a* and the other two wheels 100 may flank the other leg 104*b* along front and rear sides of the legs 104*a*, 104*b* so as to not protrude into the space between the legs 104*a*, 104*b* configured to accommodate a welder's legs. To lock the welding table 100 in a desired location, the base 106 may include one or more floor locks 112. The one or more floor locks 112 may be configured to lift the one or more wheels 110 off of the ground surface to immobilize the welding table 100. As illustrated in FIG. 2, the welding table 100 may include two floor locks 112 coupled with adjacent cross bars 108. The floor locks 112 may be positioned between the two rear wheels 110 and beneath the cross bars 108 so as to not protrude into the space between the legs 104*a*, 104*b* configured to accommodate a welder's legs. Although the welding table 100 illustrated in FIGS. 1 and 2 includes four wheels 110 and two floor locks 112, the welding table 100 may include more or less than four wheels 110 and/or more or less than two floor locks 112.

Figure 3:
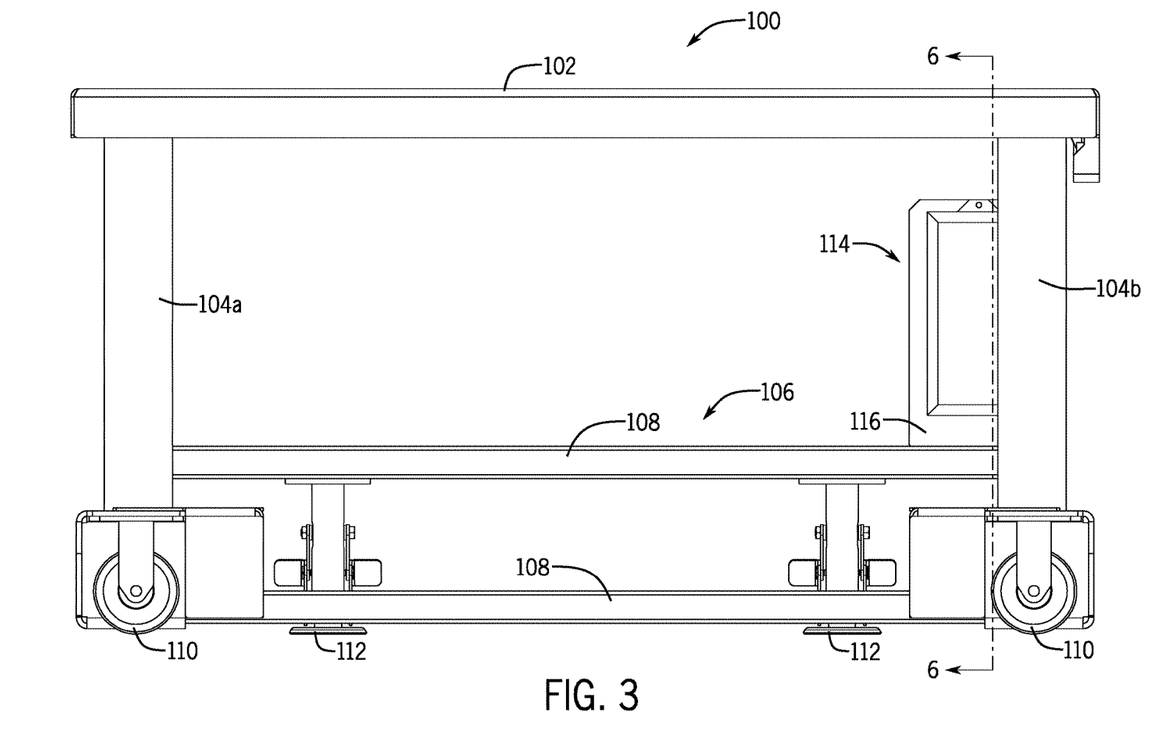
FIG. 3 is a front elevation view of the welding table of FIG. 1, according to certain implementations.
Figure 6:
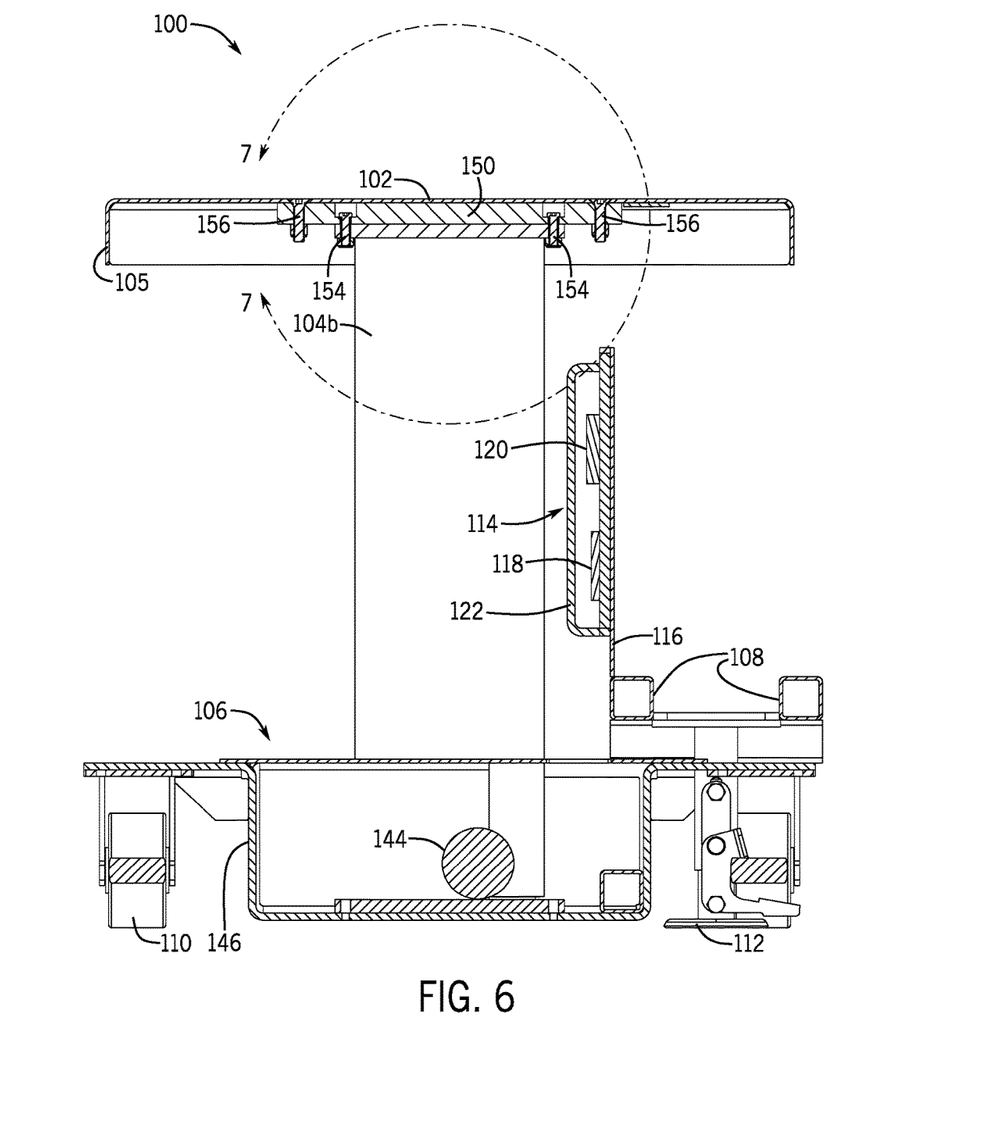
FIG. 6 is a cross-sectional view of the welding table of FIG. 1 taken along line 6-6 of FIG. 3, according to certain implementations.

FIG. 3 is a front elevation view of the welding table 100. As illustrated in FIG. 3, the welding table 100 may include control equipment 114 coupled with at least one of the legs 104*a*, 104*b*. For example, as illustrated in FIGS. 1-3, the control equipment 114 may be attached to the base 106 via a mounting bracket 116, and the base 106 is attached to the legs 104*a*, 104*b*. In certain implementations, the control equipment 114 includes electrical equipment for controlling the table and/or electrical equipment joined to the table. For instance the control equipment 114 may include an electric controller 118 (see FIG. 6) electrically coupled with the legs 104*a*, 104*b*. In certain implementations, the control equipment 114 includes a power inverter 120 (see FIG. 6) for changing alternating current (AC) power to direct current (DC) power. In certain implementations, the power inverter 120 (see FIG. 6) changes 110 Volt AC power to 24 Volt DC power. As illustrated in FIG. 6, the controller 118 and the power inverter 120 may be positioned within a housing 122, such as a control box, that is attached to the base 106 via the mounting bracket 116. The housing 122 may be supplied with an AC power cord, and the power inverter 120 may change the AC power to DC power.

Figure 4A:
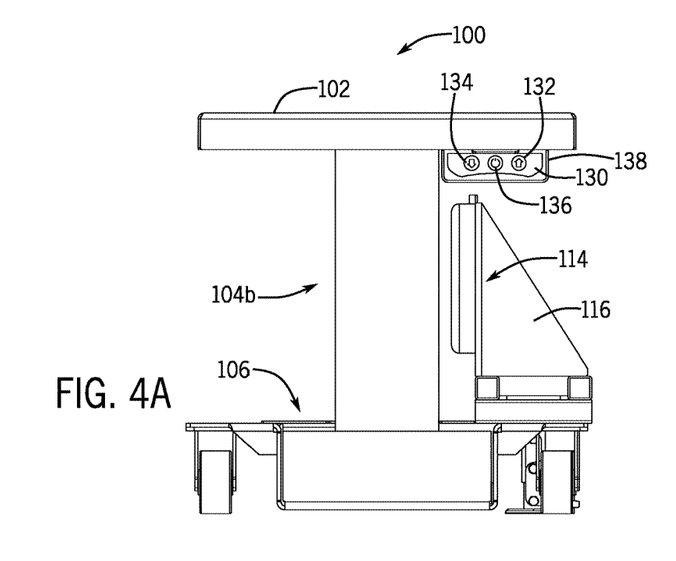
FIG. 4A is a right side elevation view of the welding table of FIG. 1 in a lowered configuration, according to certain implementations.
Figure 4B:
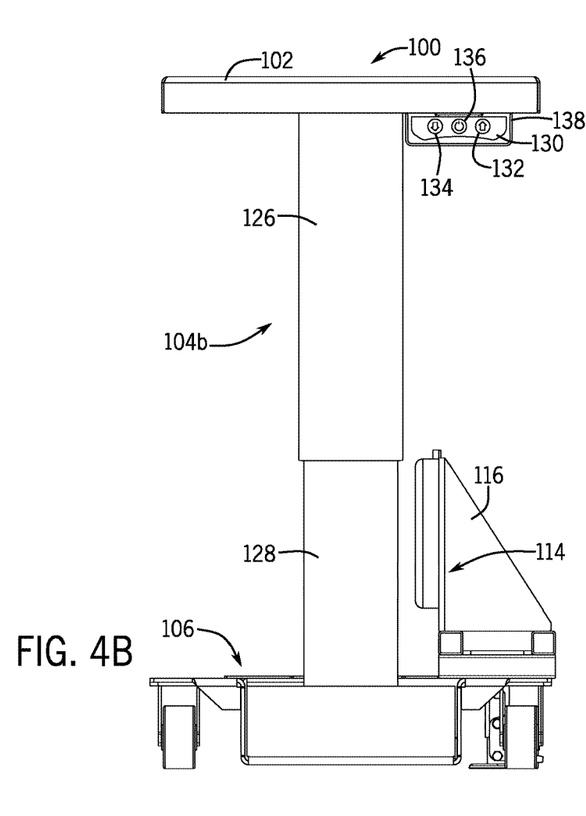
FIG. 4B is a right side elevation view of the welding table of FIG. 1 in a raised configuration, according to certain implementations.

FIGS. 4A and 4B are right side elevation views of the welding table 100. As illustrated in FIGS. 4A and 4B, the welding table 100 may be height adjustable. In FIG. 4A, the welding table 100 is illustrated in a lowered configuration. In this lowered configuration, the tabletop 102 of the welding table 100 may be positioned closer to a support surface, such as a floor in a building. In FIG. 4B, the welding table 100 is illustrated in a raised configuration. In this raised configuration, the table top 102 of the welding table 100 may be positioned further away from the support surface.

Referring to FIGS. 4A and 4B, each of the legs 104*a*, 104*b* may be telescopic to alter the height of the table top 102. As illustrated in FIG. 4B, each leg 104*a*, 104*b* may include a first leg member 126 and a second leg member 128. The first leg member 126 may be coupled with the tabletop 102, and the second leg member 128 may be coupled with the base 106. The first leg member 126 may telescope relative to the second leg member when the table top 102 is being raised to accommodate the change in height. In certain implementations, the second leg member 128 may be received at least partially within first leg member 126, and vice versa. As illustrated in FIG. 4A, the second leg member 128 may be concealed within the first leg member 126, and the first leg member 126 may be positioned adjacent the base 106, when the welding table 100 is in the lowered configuration. As illustrated in FIG. 4B, the second leg member 128 may be exposed, and the first leg member 126 may be separated from the base 106 by the height of the exposed portion of the second leg member 128, when the welding table 100 is in the raised configuration. To accommodate the second leg member 128, the first leg member 126 may be formed as a tube. As illustrated in FIGS. 1 and 2, the legs 104*a*, 104*b* may have rectangular profiles, although other profiles may be used.

With continued reference to FIGS. 4A and 4B, the welding table 100 may include a user input device, such as a remote 130, for adjusting the height of the table top 102. The remote 130 may include one or more buttons operable to set the height of the table top 102. For example, the remote 130 may include a raise button 132 operable to raise the height of the table top 102 and a lower button 134 operable to lower the height of the table top 102. The remote 130 may include a power button 136 to activate or deactivate the remote 130. The remote 130 may be in electrical communication with the control equipment 114, such as the controller 118 (see FIG. 6), to control the height of the table top 102. The remote 130 may communicate with the controller 118 via a wired or wireless connection.

Referring still to FIGS. 4A and 4B, the remote 130 may be coupled to the table top 102 to provide easy access by an operator, such as a welder. As illustrated in FIGS. 4A and 4B, the remote 130 may be attached to an underside of the table top 102 such that the remote 130 does not obstruct the upper working surface of the table top 102, yet is easily accessible by an operator. By being attached to the table top 102, the remote 130 may move with the table top 102 to facilitate access by an operator. The remote 130 may be positioned along a side edge of the table top 102 and may be oriented with the buttons facing outwardly to the side of the table top 102. A guard 138 may be positioned around the remote 130 to protect the remote 130 from damage. The remote 130 may be attached to the table top 102 via a mounting bracket 140 (see FIG. 5). The mounting bracket 140 may electrically isolate the remote 130 from the table top 102 to prevent an electric charge from being transferred from the table top 102 to the remote 130. In certain implementations, the mounting bracket 140 may include an isolator 142 (see FIG. 5) that abuts against the underside of the table top 102 to prevent electric discharge from the table top 102 to the remote 130.

To vary the height of the table top 102, the legs 104a, 104b may be height adjustable. As illustrated in FIGS. 2 and 6, the welding table 100 may include one or more linear actuators 144 coupled with the legs 104a, 104b to adjust the length of the legs 104a, 104b, thereby adjusting the height of the table top 102. In certain implementations, a linear actuator 144 is coupled with each leg 104a, 104b. The one or more linear actuators 144 may be operable to raise and lower the first leg members 126 relative to the second leg members 128 to thereby raise and lower the table top 102. The one or more linear actuators 144 may be electrically coupled with the controller 118 (see FIG. 6) and the remote 130 (see FIGS. 4A and 4B) such that an operator (for example, a welder) can activate the one or more linear actuators 144 as desired to set the height of the table top 102. The welding table 100 may include a guard 146 that protects the one or more linear actuators 144 from damage, such as by protecting the one or more linear actuators 144 from being kicked by a welder while the welder is seated at the welding table 100. The guard 146 may form part of the base 106 of the welding table 100. In certain implementations, the one or more linear actuators 144 comprise one or more motors configured to adjust the length of the legs 104a, 104b. In certain implementations, the legs 104a, 104b and the one or more linear actuators 144 form lifting columns. The one or more linear actuators 144 may communicate with the control equipment 114 via a wired or wireless connection. For wired connections, wires extending between the control equipment 114 and the one or more linear actuators 144 may be routed through the one or more cross braces 108.

Figure 5:
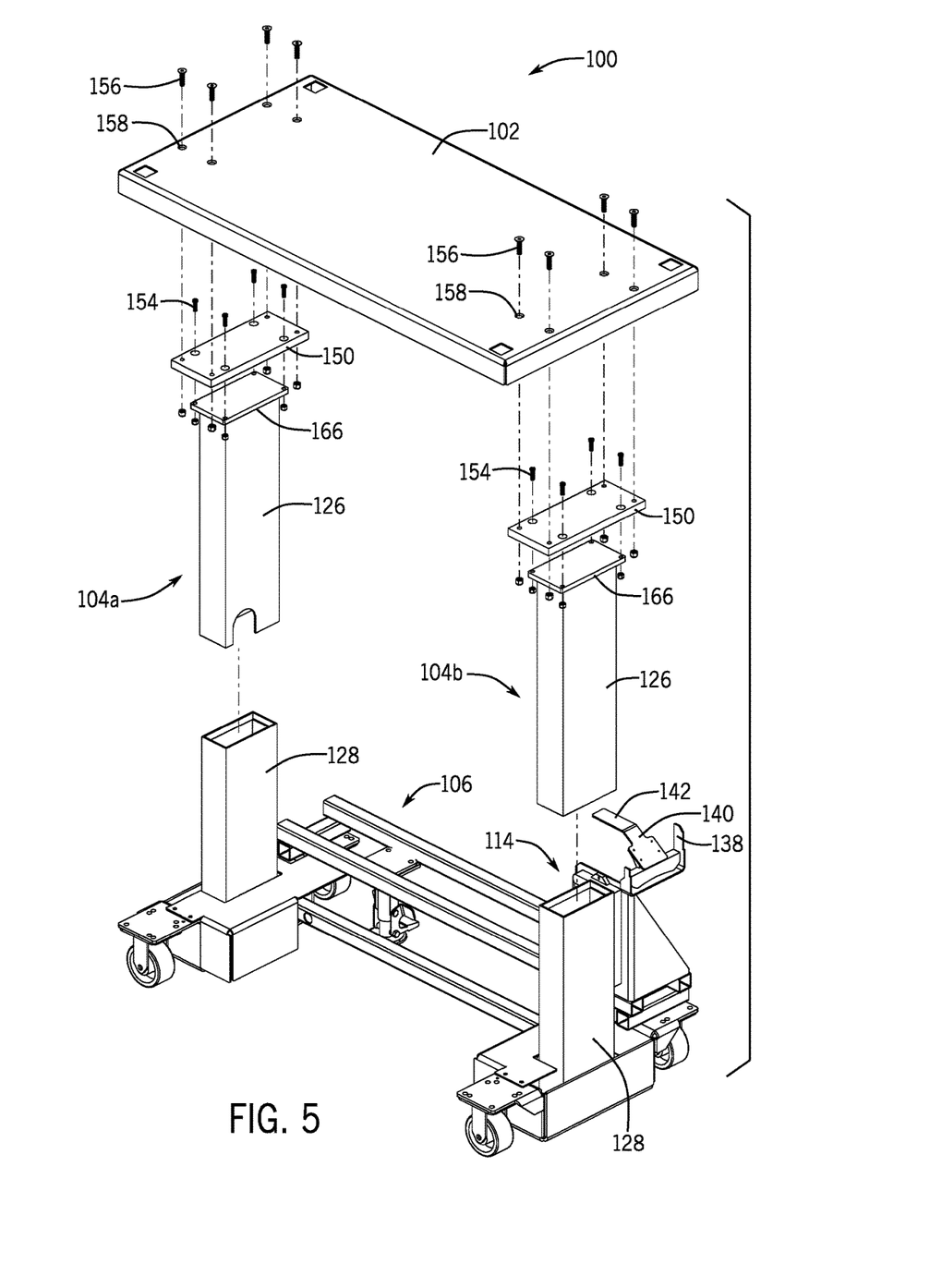
FIG. 5 is a partial exploded view of the welding table of FIG. 1, according to certain implementations.

FIG. 5 is a partial exploded view of the welding table 100. In FIG. 5, the first leg members 126 are exploded from the second leg members 128 and the table top 102, and the second leg members 128 are attached to the base 106. The second leg members 128 may be dimensioned to at least partially fit inside the first leg members 126, or vice versa, such that the legs 104a, 104b are telescopic. As illustrated in FIG. 5, the first leg members 126 and the second leg members 128 may be formed as tubes, such as rectangular tubes.

The legs 104a, 104b may be electrically isolated from the table top 102 to prevent an electric charge from being transmitted from the table top 102 to the legs 104a, 104b, thereby preventing electrical equipment coupled with the legs 104a, 104b from being damaged by the electric charge. As illustrated in FIG. 5, the welding table 100 may include one or more isolators 150 that electrically isolate the legs 104a, 104b from the table top 102. The welding table 100 may include an isolator 150 for each leg of the welding table 100. As illustrated in FIG. 5, the welding table 100 may include a pair of isolators 150 to isolate the legs 104a, 104b, respectively, from the table top 102. In certain implementations, a single isolator 150 may be used to electrically isolate one, some, or all of the legs of the welding table 100 from the table top 102. For example, in FIG. 5, a single isolator 150 may be used to isolate both legs 104a, 104b from the table top 102. The one or more isolators 150 may be formed of a non-electrically conductive material. For example, the one or more isolators 150 may be formed of polyethylene, such as ultra high molecular weight (UHMW) polyethylene. UHMW polyethylene may be used, for example, because of its resistance to electrical conductivity and its machinability for manufacturing processes utilizing machining. In certain implementations, the one or more isolators 150 may be formed of various types of plastics, ceramics, and/or composites that are resistant to electrical conductivity. For large scale production, the one or more isolators 150 may be injection molded, in which case the isolators 150 may be formed of types of plastic suitable for injection molding and resistant to electrical conductivity.

Figure 7:
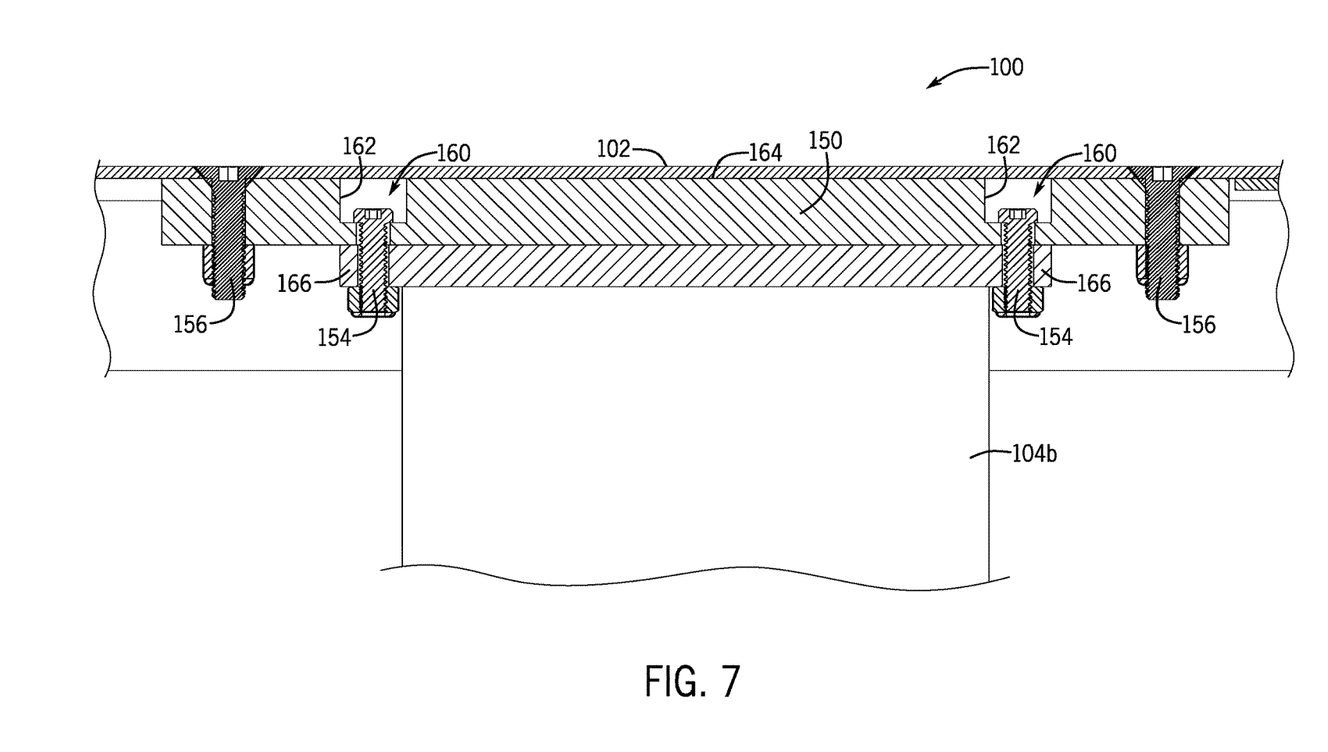
FIG. 7 is a detail view of the area circumscribed by line 7-7 in FIG. 6, according to certain implementations.

FIG. 6 is a cross-sectional view of the welding table 100 taken along line 6-6 of FIG. 3, and FIG. 7 is a detail view of the area circumscribed by line 7-7 in FIG. 6. As illustrated in FIGS. 5-7, the one or more isolators 150 electrically isolate the legs 104a, 104b from the table top 102 to prevent an electric charge from being transmitted from the table top 102 to the legs 104a, 104b, thereby protecting the control equipment 114 and/or the one or more linear actuators 144 (see FIG. 6) coupled with the legs 104a, 104b from damage, such as electrical burnout. The one or more isolators 150 may be positioned between the legs 104a, 104b and the table top 102 to electrically isolate the legs 104a, 104b from the table top 102. As illustrated in FIGS. 5-7, the isolators 150 may be sandwiched between the legs 104a, 104b and the table top 102 to prevent the table top 102 from directly contacting the legs 104a, 104b. For example, the isolators 150 may be positioned beneath the table top 102 and on top of the legs 104a, 104b, respectively. As illustrated in FIG. 6, the isolators 150 may be contiguous with the table top 102 and the legs 104a, 104b. For example, an upper surface of the isolators 150 may contact a lower surface of the table top 102, and a lower surface of the isolators 150 may contact an upper surface of the legs 104a, 104b. The isolators 150 may be concealed beneath the table top 102. The isolators 150 may be formed in a similar shape as the top of the legs 104a, 104b. For example, as illustrated in FIG. 5, the isolators 150 may be formed as rectangular plates, although other shapes may be used. The isolators 150 may be larger than the legs 104a, 104b to facilitate coupling of the isolators 150 with the table top 102 and the legs 104a, 104b.

With continued reference to FIGS. 5-7, the table top 102 and each leg 104a, 104b may be coupled to a respective isolator 150 independently of each other. In other words, the isolators 150 may be independently coupled with each leg 104a, 104b and the table top 102 to ensure the legs 104a, 104b are electrically isolated from the table top 102. As illustrated in FIGS. 5-7, the isolators 150 may be coupled with the legs 104a, 104b via a first group of fasteners 154 and with the table top 102 via a second group of fasteners 156. The first group of fasteners 154 may couple the isolators 150 with the legs 104a, 104b without the fasteners 154 contacting the table top 102, and the second group of fasteners 156 may couple the table top to the isolators 150 without the fasteners 156 contacting the legs 104a, 104b, thereby ensuring an electric charge associated with the table top 102 is not transferred to the legs 104a, 104b via the fasteners 154, 156. The first group of fasteners 154 and/or the second group of fasteners 156 may comprise bolts and nuts (as illustrated in FIGS. 5-7), rivets, screws, or other fasteners capable of independently coupling the isolators 150 with the legs 104a, 104b and the table top 102.

Referring to FIG. 7, the second group of fasteners 156 may be positioned outwardly of the first group of fasteners 154. As illustrated in FIG. 7, the isolator 150 may be positioned on top of the leg 104b and may extend outwardly of the leg 104b to enable the second group of fasteners 156 to couple the isolator 150 with the table top 102 without contacting the leg 104b. As illustrated in FIG. 5, the second group of fasteners 156 may extend through apertures 158 defined in the table top 102, and, as illustrated in FIG. 7, the second group of fasteners 156 may be flush (e.g., coplanar) with the table top 102 such that the second group of fasteners 156 do not obstruct the upper working surface of the table top 102.

Referring still to FIG. 7, the first group of fasteners 154 may be positioned inwardly of the second group of fasteners 156. The first group of fasteners 154 may be spaced apart from the table top 102 to enable the first group of fasteners 154 to couple the isolators 150 with the legs 104a, 104b without contacting the table top 102. As illustrated in FIG. 7, the first group of fasteners 154 may be separated from the table top 102 by respective air gaps 160 defined by respective recesses 162 formed in the isolator 150. In certain implementations, recesses 162 are formed in an upper surface 164 of the isolator 150 and are dimensioned to ensure air gaps 160 exist between the first group of fasteners 154 and the table top 102. The first group of fasteners 154 may be coupled with upper ends of the legs 104a, 104b. As illustrated in FIG. 5, the legs 104a, 104b may include flanges 166 at their upper ends to facilitate connection of the isolator 150 with the legs 104a, 104b. For example, as illustrated in FIG. 7, the first group of fasteners 154 may extend through the isolator 150 and may be secured to flange 166 to couple isolator 150 with the respective leg 104b. The second group of fasteners 156 may extend through the table top 102 and may be secured to the isolator 150 around a periphery of the flange 166.

Figure 8:
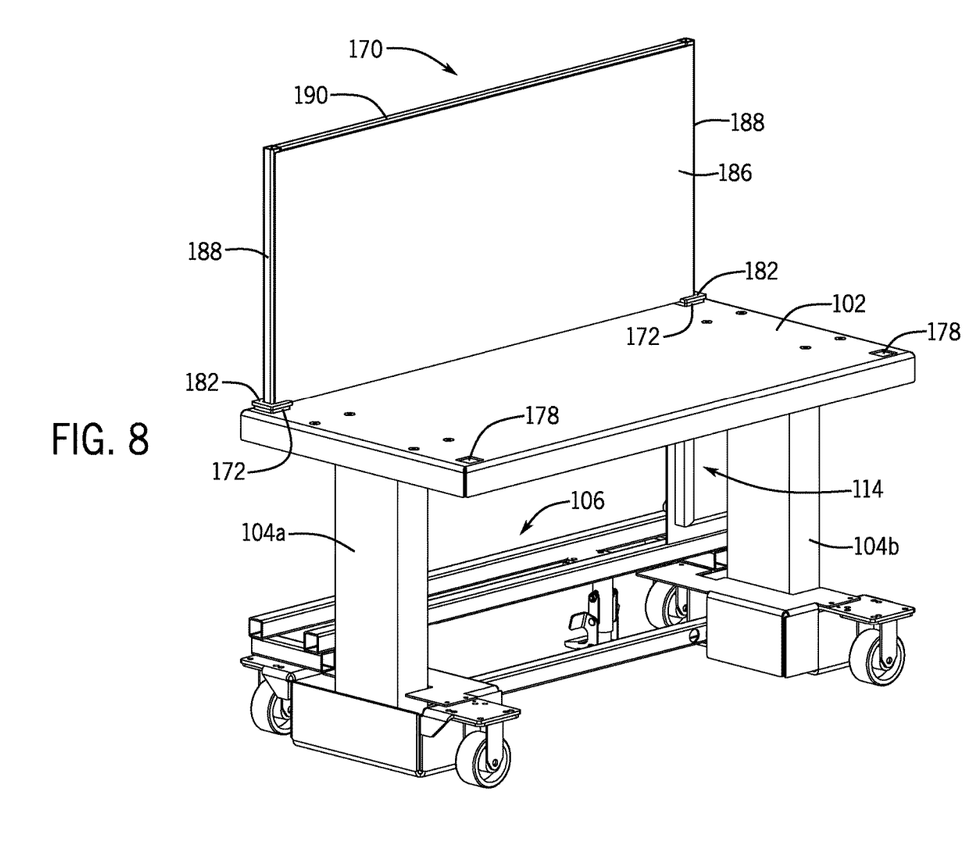
FIG. 8 is a front isometric view of the welding table of FIG. 1 including a divider, according to certain implementations.

FIG. 8 is a front isometric view of the welding table 100 including a divider 170 for protecting a welder's eyes from flash burn caused by an adjacent welder's arc. The divider 170 may be oriented vertically and may extend substantially perpendicular to the table top 102. As illustrated in FIG. 8, the divider 170 may extend along a rear edge of the table top 102 along substantially the entire length of the table top 102. Although not illustrated, the divider 170 may include side panels that extend along side edges of the table top 102 along substantially the entire depth of the table top 102 to further protect the welder's eyes from flash burn.

Figure 9:
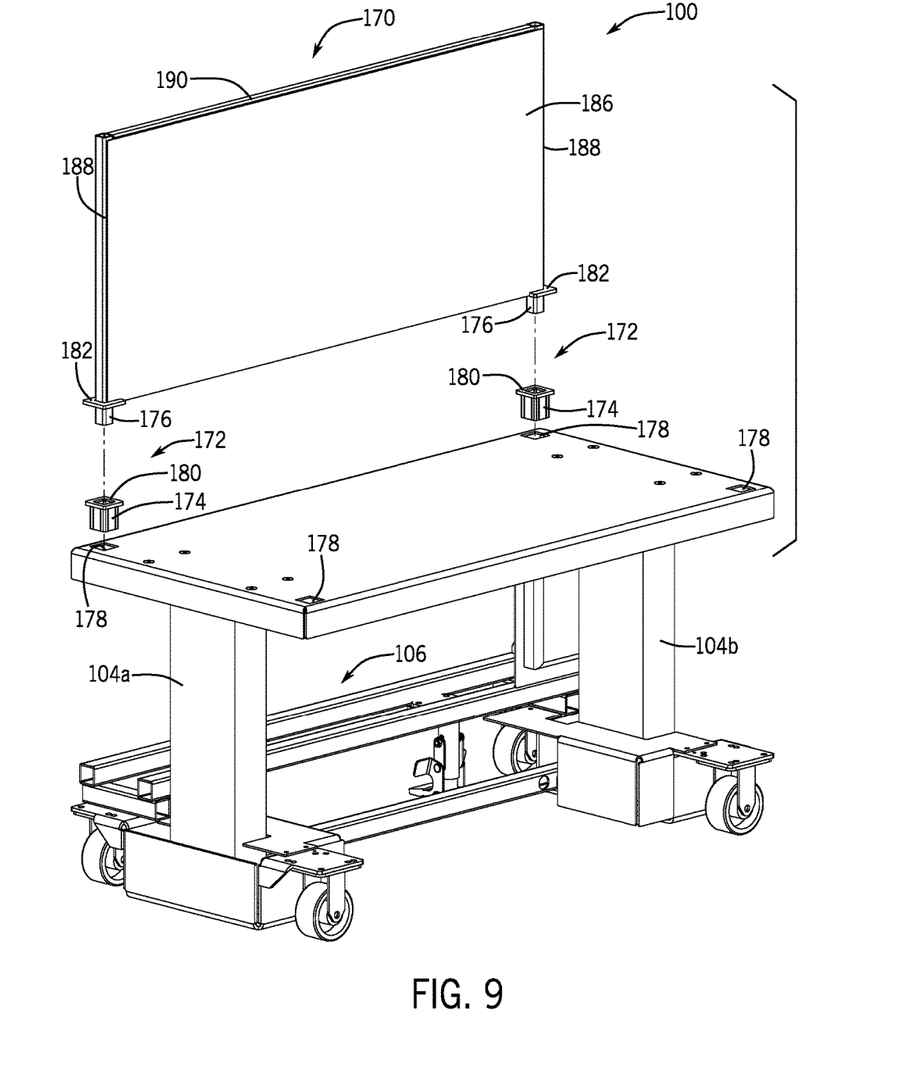
FIG. 9 is a partial exploded view of the welding table of FIG. 8, according to certain implementations.

The divider 170 may be coupled with the table top 102. The divider 170 may be formed from an electrically conductive material, such as steel. Thus, to restrict a welder from welding on the divider 170 for example, the divider 170 may be electrically isolated from the table top 102 and from the electrically conductive legs 104a, 104b. Referring to FIG. 9, which is a partial exploded view of the welding table 100, the welding table 100 may include one or more isolators 172 positioned between the divider 170 and the table top 102 to electrically isolate the divider 170 from the table top 102. The isolators 172 may include a sleeve portion 174 configured to receive downwardly-extending posts 176 of the divider 170 and to be received at least partially in openings 178 formed in the table top 102, thereby electrically isolating the posts 176 from the table top 102. The isolators 172 may include a shoulder 180 protruding outwardly from the sleeve portion 174 for abutting against the table top 102. The divider 170 may abut against the shoulder 180 such that the shoulder 180 is sandwiched between the divider 170 and the table top 102 to prevent the divider 170 from directly contacting the table top 102. In certain implementations, the divider 170 may include a stop 182 protruding outwardly from the post 176 for seating against the shoulder 180. The stop 182 may include substantially the same dimensions and shape as the shoulder 180 of the isolator 172. The one or more isolators 172 may be formed of a non-electrically conductive material. For example, the one or more isolators 172 may be formed of polyethylene, such as ultra high molecular weight (UHMW) polyethylene. UHMW polyethylene may be used, for example, because of its resistance to electrical conductivity and its machinability for manufacturing processes utilizing machining. In certain implementations, the one or more isolators 172 may be formed of various types of plastics, ceramics, and/or composites that are resistant to electrical conductivity. For large scale production, the one or more isolators 172 may be injection molded, in which case the isolators 172 may be formed of various types of plastic suitable for injection molding and resistant to electrical conductivity.

Referring to FIGS. 8 and 9, the divider 170 may include a substantially flat panel 186, upright frame members 188 extending along opposing side edges of the panel 186, and a substantially horizontal frame member 190 extending along a top edge of the panel 186. The frame members 188, 190 may be attached (e.g., welded) to the panel 186 and may stiffen the panel 186. The upright frame members 188 may extend past the bottom edge of the panel 186 to define posts 176 for insertion into the isolators 172, which in turn are insertable into the openings 178 for coupling the divider 170 with the table top 102.

To assemble the welding table 100, the legs 104a, 104b may be coupled to the isolators 150. For example, the legs 104a, 104b may be coupled to the isolators 150 via the first group of fasteners 154. Then, the table top 102 may be coupled to the isolators 150. For example, the table top 102 may be coupled to the isolators 150 via the second group of fasteners 156 such that the isolators 150 are positioned between the legs 104a, 104b and the table top 102. In such configuration, the isolators 150 electrically isolate the legs 104a, 104b from the table top 102 to prevent an electric charge from being transmitted from the table top 102 to the legs 104a, 104b, thereby protecting any electrical components coupled with the legs 104a, 104b from damage, such as electrical burnout. In certain implementations, a divider 170 may be coupled to the table top 102 such that the divider 170 is electrically isolated from the table top 102. For example, sleeve portions 174 of isolators 172 may be inserted into openings 178 defined in the table top 102 until shoulders 180 of the isolators 172 abut against the table top 102 to limit further insertion of the isolators 172 into the openings 178. The divider 170 may be positioned over the table top 102 such that posts 176 of the divider 170 are aligned with the openings 178 of the table 100. Then, the divider 170 may be lowered toward the table top 102 such that the posts 176 are received inside the sleeve portions 174 of the isolators 172 until stops 182 associated with the posts 176 abut against the shoulders 180 of the isolators 172. In such configuration, the isolators 172 electrically isolate the divider 170 from the table top 102, thereby inhibiting a welder from welding on the divider 170, for example.

Although certain embodiments of the present disclosure are described herein with reference to the examples in the accompanying figures, it would be apparent to those skilled in the art that several modifications to the described embodiments, as well as other embodiments of the present invention are possible without departing from the spirit and scope of the present disclosure.

What is claimed is:
1. A welding table, comprising:
an electrically conductive table top; and
an electrically conductive leg coupled with the table top to support the table top, wherein the leg is electrically isolated from the table top to prevent an electric charge from being transmitted from the table top to the leg.

2. The welding table of claim 1, further comprising an isolator electrically isolating the leg from the table top.

3. The welding table of claim 2, wherein the isolator is positioned between the leg and the table top.

4. The welding table of claim 2, wherein the isolator is independently coupled with the leg and the table top.

5. The welding table of claim 4, wherein the isolator is coupled with the leg via a first group of fasteners and the table top via a second group of fasteners.

6. The welding table of claim 5, wherein the first group of fasteners is separated from the table top by respective air gaps defined by respective recesses formed in the isolator.

7. The welding table of claim 1, wherein the leg is height adjustable.

8. The welding table of claim 7, further comprising a controller coupled with the leg to control the height of the table top,
wherein the electrical isolation of the leg from the table top prevents an electric charge from being transmitted from the table top to the controller.

9. The welding table of claim 7, further comprising a linear actuator coupled with the leg to adjust the height of the table top,
wherein the electrical isolation of the leg from the table top prevents an electric charge from being transmitted from the table top to the linear actuator.

10. The welding table of claim 1, further comprising:
an electrically conductive divider coupled with the table top; and
an isolator positioned between the divider and the table top to electrically isolate the divider from the table top.

11. A welding table, comprising:
an electrically conductive table top; and
first and second electrically conductive legs coupled with the table top to support the table top,
wherein the first and second legs are electrically isolated from the table top to prevent an electric charge from being transmitted from the table top to the first and second legs.

12. The welding table of claim 11, further comprising first and second isolators electrically isolating the first and second legs, respectively, from the table top.

13. The welding table of claim 12, wherein the first and second isolators are positioned between the first and second legs, respectively, and the table top.

14. The welding table of claim 12, wherein:
the first isolator is independently coupled with the first leg and the table top; and
the second isolator is independently coupled with the second leg and the table top.

15. The welding table of claim 11, wherein the first and second legs comprise first and second telescopic legs, respectively, that are height adjustable.

16. The welding table of claim 15, further comprising a controller coupled with the first and second legs to control the height of the table top,
wherein the electrical isolation of the first and second legs from the table top prevents an electric charge from being transmitted from the table top to the controller.

17. The welding table of claim 15, further comprising first and second linear actuators coupled with the first and second legs, respectively, to adjust the height of the table top,
wherein the electrical isolation of the first and second legs from the table top prevents an electric charge from being transmitted from the table top to the first and second linear actuators.

18. The welding table of claim 11, further comprising:
an electrically conductive divider coupled with the table top; and
one or more isolators positioned between the divider and the table top to electrically isolate the divider from the table top.

19. A method of assembling a welding table, comprising:
coupling an electrically conductive leg to an isolator; and
coupling an electrically conductive table top to the isolator such that the isolator is positioned at least partially between the leg and the table top,
wherein the isolator electrically isolates the leg from the table top to prevent an electric charge from being transmitted from the table top to the leg.

20. The method of claim 19, further comprising coupling a divider to the table top such that the divider is electrically isolated from the table top and the electrically conductive leg.

* * * * *